United States Patent [19]

Wittmann et al.

[11] Patent Number: 4,866,123
[45] Date of Patent: Sep. 12, 1989

[54] MOLDING COMPOSITIONS OF POLYCARBONATE AND POLYALKYLENE TEREPHTHALATE SHOWING IMPROVED JOINT LINE STRENGTH

[75] Inventors: Dieter Wittmann, Krefeld, Fed. Rep. of Germany; Hans-Jürgen Kress, Pittsburgh, Pa.; Karl-Heinz Ott, Leverkusen; Christian Lindner, Cologne, both of Fed. Rep. of Germany

[73] Assignee: Bayer Aktiengesellschaft, Leverkusen, Fed. Rep. of Germany

[21] Appl. No.: 232,019

[22] Filed: Aug. 15, 1988

[30] Foreign Application Priority Data

Aug. 27, 1987 [DE] Fed. Rep. of Germany ....... 3728604

[51] Int. Cl.$^4$ .............................................. C08L 69/00
[52] U.S. Cl. ..................... 525/67; 525/439
[58] Field of Search ................... 525/67, 148, 439

[56] References Cited

U.S. PATENT DOCUMENTS 3,864,428  2/1975  Nakamura et al. ................... 525/67
4,515,918  5/1985  Nouverté et al. ................. 524/504

Primary Examiner—Theodore E. Pertilla
Attorney, Agent, or Firm—Connolly and Hutz

[57] ABSTRACT

Molding compositions of polycarbonate, polyalkylene terephthalate and special graft polymer show high joint line strength and high toughness at low temperatures.

9 Claims, No Drawings

MOLDING COMPOSITIONS OF POLYCARBONATE AND POLYALKYLENE TEREPHTHALATE SHOWING IMPROVED JOINT LINE STRENGTH

This invention relates to thermoplastic molding compositions of aromatic polycarbonate, polyalkylene terephthalate and special graft polymer, to a process for the production of these molding compositions by mixing of the components at elevated temperature and to the use of the molding compositions for the production of molded articles, mainly by injection molding.

Molding compositions of aromatic polycarbonate, polyalkylene terephthalate and elastomeric polymer are known (U.S. Pat. No. 3,864,428, EP-A Nos. 25 920, 64 648, 110 222, JP-A No. 59-166 556). They may be processed to high-impact moldings.

It has now surprisingly been found that molding compositions of aromatic polycarbonate, polyalkylene terephthalate and elastomeric polymer show a particularly advantageous combination of joint line strength and low-temperature toughness if special elastomeric graft polymers are used.

The present invention relates to thermoplastic molding compositions of
A. 10 to 95% by weight and preferably 50 to 90% by weight aromatic polycarbonate,
B. 5 to 90% by weight and preferably 10 to 50% by weight polyalkylene terephthalate and
C. 1 to 70% by weight, preferably 3 to 50% by weight and more preferably 5 to 35% by weight graft polymer, the above percentages being based in each case on the sum of components A and B,
characterized in that component C is a graft polymer of 5 to 90 parts by weight and preferably 20 to 80 parts by weight of a graft overlay of
C.1 a mixture of—based in each case on component C.1—30 to 40% by weight and preferably 33 to 36% by weight α-methyl styrene,
52 to 62% by weight and preferably 54 to 57% by weight methyl methacrylate and
4 to 14% by weight and preferably 8.5 to 11.5% by weight acrylonitrile and/or
C.2 a mixture of
C.2.1 50 to 95 parts by weight styrene, α-methyl styrene, $C_1$–$C_4$ alkyl or halogen-nucleus-substituted styrene, methyl methacrylate or mixtures thereof and
C.2.2 5 to 50 parts by weight acrylonitrile, methacrylonitrile, methyl methacrylate, maleic anhydride, $C_1$–$C_4$ alkyl or phenyl-N-substituted maleic imide or mixtures thereof and
C.2.3 1 to 40 parts by weight and preferably 3 to 20 parts by weight acrylic acid ester of a primary or secondary monohydric aliphatic $C_2$–$C_{10}$ alcohol and/or
C.2.4 0.1 to 10 parts by weight and preferably 0.3 to 4 parts by weight acrylic or methacrylic acid ester of tert.-butanol on
C.3 10 to 95 parts by weight and preferably 20 to 80 parts by weight of a polymer having a glass transition temperature below −10° C. and preferably below −20° C.

In the context of the invention, aromatic polycarbonates A are homopolycarbonates, copolycarbonates and mixtures of these polycarbonates based, for example, on at least one of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones, α,α'-bis-(hydroxyphenyl)-diisopropylbenzenes, and also nucleusalkylated and nucleus-halogenated derivatives thereof. These and other suitable diphenols are described, for example, in U.S. Pat. Nos. 3,028,365, 3,275,601, 3,148,172, 3,062,781, 2,991,273, 3,271,367, 2,999,835, 2,970,131 and 2,999,846; in DE-OSS Nos. 1 570 703, 2 063 050, 2 063 052, 2 211 956, 2 211 957, in FR-P No. 1 561 518 and in the work by H. Schnell entitled "Chemistry and Physics of Polycarbonates", Interscience Publishers, New York, 1964.

Preferred diphenols are, for example, 4,4'-dihydroxydiphenyl, 2,4-bis-(4-hydroxyphenyl)-2-methylbutane, α,α'-bis-(4-hydroxyphenyl)-p-diisopropylbenzene, 2,2-bis-(3-methyl-4-hydroxyphenyl)-propane and 2,2-bis-(3-chloro-4-hydroxyphenyl)propane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

In general, the preferred diphenols for the production of the aromatic polycarbonates A correspond to the following formula $$HO—Z—OH \qquad (I)$$

in which Z is a difunctional, mononuclear or polynuclear aromatic $C_6$–$C_{30}$ radical, the two OH groups each being directly attached to a carbon atom of an aromatic system.

Particularly preferred diphenols correspond to the following formula

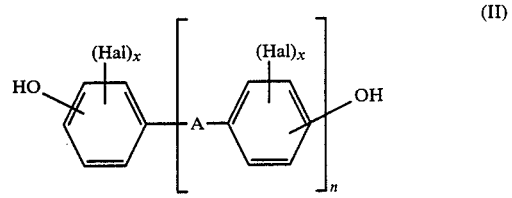

in which
A is a single bond, a $C_1$–$C_5$ alkylene, $C_2$–$C_5$ alkylidene, $C_5$–$C_6$ cycloalkylene or a $C_5$–$C_6$ alkylidene radical,
—O—, —S—,

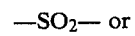

—$SO_2$— or

Hal is chlorine or bromine,
x=0, 1 or 2 and
n=0 or 1.

The aromatic polycarbonates A also include block copolycarbonates which contain from 1 to 20% by weight, preferably from 1.5 to 15% by weight and more preferably from 2 to 10% by weight, based on diphenol residues of the copolycarbonate A, of co-condensed residues of diphenols corresponding to the following formula

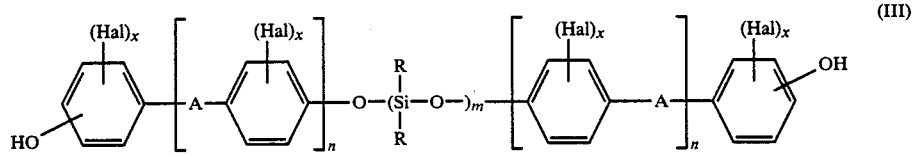

in which
A, Hal, x and n are as defined above,
m is an integer of 5 to 100 and preferably of 20 to 80 and R is a $C_1$–$C_{20}$ alkyl radical, preferably a methyl, ethyl, propyl, n-butyl, tert.-butyl radical, and a $C_6$–$C_{20}$ aryl radical, preferably phenyl, with the proviso that the substituents R independently of one another may assume any of the meanings within the definition for R not only in formula (III) above, but also at any silicon atom of the block copolycarbonate.

Where mixtures containing at least one block copolycarbonate based on a diphenol of formula (III) are used as the aromatic polycarbonates A, the proportion of co-condensed diphenol residues (III) should preferably be from 1 to 20% by weight, based on the total quantity of all the diphenol residues of the aromatic polycarbonates A used.

The production of block copolycarbonates based on diphenols corresponding to formula (III) is described, for example, in DE-OS No. 33 34 872 and in U.S. Pat. No. 3,821,325.

The aromatic polycarbonates A may be branched by the use of small quantities, preferably 0.05 to 2.0 mol-% (based on diphenols used), of trifunctional or more than trifunctional compounds, preferably those containing three or more than three phenolic hydroxyl groups.

The aromatic polycarbonates A generally have average molecular weights $M_w$ of from 10,000 to 200,000 and preferably from 20,000 to 80,000, as determined by light scattering.

To adjust the molecular weight $M_w$ of the polycarbonates A, it is possible in a known manner to use chain terminators, such as for example phenols, halogen phenols or alkylphenols, in the calculated quantities.

Particularly preferred chain terminators are, for example, phenol, p-chlorophenol, p-tert.-butylphenol or 2,4,6-tribromophenol and also long-chain alkylphenols, such as 4-(1,3-tetramethylbutyl)-phenol (DE-OS No. 2 842 005) or monoalkylphenol and dialkylphenols containing in all 8 to 20 carbon atoms in the alkyl substituents (DE-OS No. 3 506 472), such as 3,5-di-tert.-butylphenol, p-isooctylphenol p-tert.-octylphenol, p-dodecylphenol, 2-(3,5-dimethylheptyl)-phenol and 4-(3,5-dimethylheptyl)-phenol.

The quantity of chain terminators to be used is generally between 0.5 and 10 mol-%, based on the sum of the particular diphenols used.

In addition to bisphenol A homopolycarbonate, particularly preferred aromatic polycarbonates A are the copolycarbonates of bisphenol A with up to 15 mol-%, based on the total sum of diphenols, of 2,2-bis-(3,5-dibromo-4-hydroxyphenyl)-propane and the copolycarbonates of diphenols corresponding to formula (II) with 1 to 20% by weight of diphenols corresponding to formula (III), preferably with A=2,2-propylene, based on the sum of the diphenols (II) and (III).

In the context of the invention, polyalkylene terephthalates B are reaction products of aromatic dicarboxylic acids or reactive derivatives thereof (for example dimethyl esters or anhydrides) and aliphatic, cycloaliphatic or araliphatic diols and mixtures of these reaction products They may be prepared by known methods (Kunststoff-Handbuch, Vol. VIII, pages 695 et seq., Carl Hanser Verlag, München, 1973).

Preferred polyalkylene terephthalates B contain at least 80 mol-% and preferably at least 90 mol-%, based on the dicarboxylic acid component, of terephthalic acid residues and at least 80 mol-% and preferably at least 90 mol-%, based on the diol component, of ethylene glycol and/or butane-1,4-diol residues.

In addition to terephthalic acid residues, the preferred polyalkylene terephthalates B may contain up to 20 mol-% of residues of other aromatic or cycloaliphatic $C_8$–$C_{14}$ dicarboxylic acids or aliphatic $C_4$–$C_{12}$ dicarboxylic acids, such as for example residues of phthalic acid, isophthalic acid, naphthalene-2,6-dicarboxylic acid, 4,4'-diphenyl dicarboxylic acid, succinic, adipic, sebacic, azelaic, cyclohexane diacetic acid.

In addition to ethylene glycol or butane-1,4-diol residues, the preferred polyalkylene terephthalates B may contain up to 20 mol-% and preferably up to 10 mol-% of other aliphatic diols containing 3 to 12 carbon atoms or cycloaliphatic diols containing 6 to 21 carbon atoms, for example residues of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3- and -1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl cyclobutane, 2,2-bis-(3-β-hydroxyethoxyphenyl)-propane and 2,2-bis-(4-hydroxypropoxyphenyl)-propane (DE-OS Nos. 24 07 647, 24 07 776, 27 15 932).

The polyalkylene terephthalates B may be branched by incorporation of relatively small quantities of trihydric or tetrahydric alcohols or tribasic or tetrabasic carboxylic acids of the type described, for example, in DE-OS No. 19 00 270 and in U.S. Pat. No. 3,692,744. Examples of preferred branching agents are trimesic acid, trimellitic acid, trimethylolethane and propane and pentaerythritol.

Particularly preferred polyalkylene terephthalates B are those which have been produced solely from terephthalic acid or reactive derivatives thereof (for example dialkyl esters) and ethylene glycol and/or butane-1,4-diol, and mixtures of these polyalkylene terephthalates.

The polyalkylene terephthalates preferably used as component B generally have an intrinsic viscosity of from 0.4 to 1.5 dl/g, preferably from 0.5 to 1.3 dl/g and more preferably from 0.6 to 1.2 dl/g, as measured in phenol/o-dichlorobenzene (1:1 parts by weight) at 25° C.

Preferred products contain as component C.3 elastomeric polymers of at least one of the following monomers: chloroprene, 1,3-butadiene, soprene, styrene, acrylonitrile, ethylene, propylene, vinyl acetate and (meth)acrylates containing 1 to 18 carbon atoms in the alcohol component; i.e. polymers of the type described, for example, in "Methoden der organischen Chemie" (Houben-Weyl), Vol. 14/1, Georg Thieme Verlag, Stuttgart 1961, pages 393–406, and in C. B. Bucknall, "Toughened Plastics". Appl. Science Publishers, London 1977.

Preferred polymers C.3 include, above all, polychloroprene, polyisoprene, EPDM rubbers of ethylene, propylene and a—preferably unconjugated—diene, ethylene/vinyl acetate copolymers and butadiene/styrene copolymers containing up to 30% by weight, based on butadiene/styrene copolymer, of copolymerized units of (meth)acrylic acid $C_1$–$C_4$ alkyl esters (such as for example methyl acrylate and methacrylate, ethyl acrylate and methacrylate).

Particularly preferred polymers C.3 are polybutadienes and acrylate rubbers.

Preferred polybutadienes C.3 are polymers containing at least 50% by weight, based on polybutadiene, of copolymerized butadiene residues and up to 50% by weight, based on polybutadiene, of copolymerized residues of other ethylenically unsaturated monomers, such as for example styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and vinyl ethers. A preferred graft base C.3 consists of pure polybutadiene.

Preferred acrylate rubbers C.3 are polymers of alkyl acrylates, optionally containing up to 30% by weight, based on acrylate rubber, of other polymerizable, ethylenically unsaturated monomers. Preferred polymerizable acrylates include $C_1$–$C_8$ alkyl esters, for example methyl, ethyl, butyl, octyl and 2-ethylhexyl esters; halogen alkyl esters, preferably halogen $C_1$–$C_8$ alkyl esters, such as chloroethyl acrylate; and also mixtures of these monomers.

Preferred "other" polymerizable, ethylenically unsaturated monomers, which may optionally be used in addition to the acrylates for the preparation of the acrylate rubbers C.3, are for example acrylonitrile, styrene, α-methyl styrene, acrylamides, vinyl $C_1$–$C_6$ alkyl ethers, methyl methacrylate, butadiene.

The polymers C.3 are preferably at least partly crosslinked, i.e. they have a gel content of at least 60% by weight, preferably of at least 70% by weight and more preferably of at least 80% by weight. The gel content of polybutadienes is measured in toluene while the gel content of acrylate rubbers is measured in dimethylformamide, in either case at 25° C. (M. Hoffmann, H. Krömer, R. Kuhn, Polymeranalytik I and II, Georg Thieme Verlag, Stuttgart 1977).

To crosslink the polymers C.3, preferably the acrylate rubbers C.3, it is possible to copolymerize monomers containing more than one polymerizable double bond. Preferred examples of crosslinking monomers are esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, such as for example ethylene glycol dimethacrylate, allyl methacrylate; polyunsaturated heterocyclic compounds such as, for example, trivinyl and triallyl cyanurate; polyfunctional vinyl compounds, such as divinyl and trivinylbenzenes; but also triallyl phosphate and diallylphthalate.

Preferred crosslinking monomers are allyl methacrylate, ethylene glycol dimethacrylate, diallylphthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, triallylbenzenes.

The crosslinking monomers are used in quantities of preferably 0.02 to 5% by weight and more preferably 0.05 to 2% by weight, based on graft base C.3.

Where cyclic crosslinking monomers containing at least 3 ethylenically unsaturated groups are used, it is of advantage to limit the quantity to less than 1% by weight of the graft base C.3.

The polymers C 3 have average particle sizes $d_{50}$ of preferably from 0.05 to 5 μm and, more preferably, from 0.075 to 1 μm.

The average particle size $d_{50}$ is the diameter above which 50% by weight and below which 50% by weight of the particles lie. It may be determined by ultracentrifuge measurements (W. Scholtan, H. Lange, Kolloid. Z. und Z. Polymere 250 (1972), 782 to 796).

Preferred graft monomers C.2.3 are, for example, ethyl, propyl, butyl, hexyl and 2-ethylhexyl acrylate. The preferred graft monomer C.2.4 is t-butyl acrylate.

Where the graft monomers C.2 are used, it is crucial to the success of the invention that at least one of the components C.2.3 or C.2.4 is co-used.

Standard production methods for the graft polymers C are emulsion, solution, mass and suspension polymerization.

The graft monomers C.1 and/or C.2 of the graft product C are preferably grafted on by polymerization in the presence of a latex (emulsion) of the graft base C.3. The polymerization may be initiated by radical initiators, for example with persulfates, peroxides, percarbonates, peresters, but especially with water-soluble initiators, such as persulfates or redox initiator systems. These polymerization processes are known per se.

Since it is known that the graft monomers are not necessarily completely grafted onto the graft base during the grafting reaction, graft polymers C in the context of the invention are also understood to include products obtained by polymerization of the graft monomers in the presence of the graft bases.

The molding compositions according to the invention may contain standard additives, such as flow aids, mold release agents, nucleating agents, stabilizers, antistatic agents, fillers and reinforcing materials, flameproofing agents and also dyes and pigments.

The filled or reinforced molding compositions may contain up to 60% by weight, based on the reinforced molding compositions, of fillers and/or reinforcing materials. Preferred reinforcing materials are glass fibers. Preferred fillers, which may also have a reinforcing effect, are glass beads, mica, silicates, quartz, talcum, titanium dioxide, wollastonite.

The flameproofed molding compositions contain flameproofing agents in a concentration of generally less than 30% by weight, based on the flameproofed molding compositions.

The molding compositions according to the invention may be prepared by mixing of the components at elevated temperature, preferably at 200° to 330° C., i.e. may be compounded or extruded in the melt in standard machines, such as internal kneaders, extruders or twin-screw extruders. The components may be introduced into the mixing unit either simultaneously or successively.

Accordingly, the present invention also relates to a process for the production of the molding compositions according to the invention by mixing of the components at elevated temperature.

The molding compositions according to the invention may be used for the production of moldings of any kind, preferably by injection molding. Examples of moldings include housing components of all kinds, for example for domestic appliances, such as juice presses, coffee machines and mixers; cover panels for the building industry and parts for motor vehicles. They may also be used in the field of electrical engineering, for example for multipoint connectors, by virtue of their very good electrical properties.

Another form of processing is the production of moldings by deep-drawing from prefabricated sheets or panels.

Accordingly, the present invention also relates to the use of the molding compositions for the production of molded articles.

In the following Examples, parts are understood to be parts by weight.

EXAMPLES

1. Components used

A. A linear polycarbonate based on bisphenol A having a relative solution viscosity $\eta_{rel}$ of from 1.26 to 1.28, as measured in $CH_2CL_2$ at 25° C. and at a concentration of 0.5 g/100 ml.

B. A linear polyethylene terephthalate having an intrinsic viscosity $[\eta]$ of 0.85 dl/g, as measured in phenol/o-dichlorobenzene (1:1 parts by weight) at 25° C. and at a concentration of 0.5 g/dl.

C. Graft polymers

Graft bases:

C.a A polybutadiene latex prepared by aqueous emulsion polymerization and having a solids content of 44.3% by weight, an average particle diameter $d_{50}$ of 0.4 μm and a gel content of 86.5% by weight.

C.b A polybutadiene latex prepared by aqueous emulsion polymerization and having a solids content of 40.5% by weight, an average particle diameter $d_{50}$ of 0.1 μm and a gel content of 86.2% by weight.

Preparation of the graft polymers C:

750 parts of a latex of the graft base C.a or C.b are initially introduced into a reactor, followed by dilution with water to a solids content of 23.6% by weight. The polymerization is started at a temperature of 70° C by addition of a solution of 7.5 parts potassium peroxydisulfate in 195 parts water.

The following monomer streams are then uniformly introduced into the reactor with stirring over a period of 4 hours at 70° C.:

750 parts of a monomer mixture having the composition shown in Table 1,
375 parts water,
15 parts Na salt of disproportionated abietic acid and
11.5 parts aqueous 1 N sodium hydroxide.

After the addition, the mixture is further polymerized at 70° C. After stabilization with 1.6% by weight phenolic antioxidants, the latex is coagulated with a mixture of acetic acid and $MgSO_4$ at temperatures of 70° to 98° C. After washing and purification, the graft polymer is worked up to a dry powder.

TABLE 1

| | Polymers used | | | | | |
|---|---|---|---|---|---|---|
| | Graft base | Composition of the graft monomers [parts] | | | | |
| No. | [50 parts] | S | ACN | AMS | MMA | n-BA | t-BA |
| C I[(1)] | C.a | 36 | 14 | — | — | — | — |
| C II | C.a | 31.68 | 12.32 | — | — | 5 | 1 |
| C III | C.b | — | 5 | 17.25 | 27.75 | — | — |

S: styrene
ACN: acrylonitrile
AMS: α-methyl styrene
MMA: methyl methacrylate
n-BA: n-butyl acrylate
t-BA: t-butyl acrylate
[(1)]Comparison 2. Production and testing of the molding compositions:

Components A, B and C were compounded at temperatures of 200° to 220° C. in a 3-liter internal kneader.

Unless otherwise stated, moldings were produced at 260° C. in an injection molding machine. Notched impact strength was determined by the Izod method using bars measuring 2.5×0.5×0.125 inch in accordance with ASTM-D-256 at room temperature and at −20° C. (Examples 1-3).

Joint line strength was determined by measuring the impact strength in accordance with DIN 53 452 (Charpy method) at the joint line of 170×10×4 mm test specimens injected on both sides.

As shown in Table 2 below, products showing improved joint line strength and low-temperature toughness in relation to the prior art are only obtained with the molding compositions according to the invention.

TABLE 2

Composition and properties of the molding compositions

| | Components | | | | | Izod notched impact strength (J/m) | | Joint line strength (KJ/m²) |
|---|---|---|---|---|---|---|---|---|
| Examples | A | B | CI | CII | CIII | 25° C. | −20° C. | |
| | [parts] | | | | | | | |
| 1[(1)] | 67 | 22 | 11 | | | 772 | 425 | 12.7 |
| 2 | 67 | 22 | | 11 | | 833 | 520 | 15.1 |
| 3 | 67 | 22 | | | 11 | 812 | 660 | 32.7 |

[(1)]Comparison Example

We claim:

1. Thermoplastic molding compositions comprising:
   A. 10 to 95% by weight aromatic polycarbonate,
   B. 5 to 90% by weight polyalkylene terephthalate and
   C. 1 to 70% by weight graft polymer,
the above percentages being based in each case on the sum of components A and B, characterized in that component C is a graft polymer of 5 to 90 parts by weight of a graft overlay of C.1 or C.2 or a C.1–C.2 mixture wherein:
   C.1 is a mixture, based on the weight of component C.1 of
      30 to 40% by weight α-methyl styrene,
      52 to 62% by weight methyl methacrylate and
      4 to 14% by weight 2 crylonitrile;
   C.2 is a mixture of
      C.2.1 50 to 95 parts by weight styrene, α-methyl styrene, $C_1$–$C_4$ alkyl- or halogen-nucleus-substituted styrene, methyl methacrylate or mixtures thereof and C.2.2 5 to 50 parts by weight acrylontrile, methacrylonitrile, methylmethacrylate, maleic anhyride, $C_1-C_4$ alkyl- or phenyl-N-substituted maleic imide or mixtures thereof and additionally C.2.3, C.2.4 or a C.2.3-C.2.4 mixture wherein:

C.2.3 is 1 to 40 parts by weight acrylic acid ester of a primary or secondary monohydric aliphatic $C_2-C_{10}$ alcohol and C.2.4 is 0.1 to 10 parts by weight acrylic or methacrylic acid ester of tert.-butanol grafted on to C.3 10 to 95 parts weight of a polymer having a glass transition temperature below $-10°$ C.

2. Molding compositions as claimed in claim 1 of which component C consists of 20 to 80 parts by weight graft overlay C.1 C.2 or a C.1-C.2 moisture and 80 to 20 parts by weight graft base C.3.

3. Molding compositions as claimed in claim 1, in which component C.1 contains
33 to 36% by weight α- methyl styrene,
54 to 57% by weight methyl methacrylate and
8.5 to 11.5% by weight acrylonitrile.

4. Molding compositions as claimed in claim 1 in which component C.2 contains 3 to 20 parts by weight, based on the sum of C.2.1 and C.2.2, of component C.2.3.

5. Molding compositions as claimed in claim 1 in which component C.2 contains 0.3 to 4 parts by weight, based on the sum of C.2.1 and C.2.2, of component C.2.4.

6. A process for the production of the molding compositions claimed in claim 1 by mixing of the components at elevated temperature.

7. Molding composition as claimed in claim 1 wherein, based on the sum of components A and B, component A is 50 to 90% by weight, component B is 10 to 50% by weight and component C is 3 to 50% by weight.

8. Molding composition as claimed in claim 7 wherein, based on the sum of components A and B, component C is 5 to 35% by weight.

9. Molded articles prepared by molding the composition according to claim 1.

* * * * *